US009562658B2

(12) United States Patent
Higgins et al.

(10) Patent No.: US 9,562,658 B2
(45) Date of Patent: Feb. 7, 2017

(54) LIGHT DIFFRACTION DEVICE

(71) Applicant: LaserScapes LLC, New Albany, OH (US)

(72) Inventors: Richard Higgins, New Albany, OH (US); Michael Koulermos, New Albany, OH (US)

(73) Assignee: Laserscapes LLC, New Albany, OH (US)

( * ) Notice: Subject to any disclaimer, the term of this patent is extended or adjusted under 35 U.S.C. 154(b) by 118 days.

(21) Appl. No.: 14/257,636

(22) Filed: Apr. 21, 2014

(65) Prior Publication Data

US 2014/0313779 A1 Oct. 23, 2014

Related U.S. Application Data

(60) Provisional application No. 61/814,094, filed on Apr. 19, 2013.

(51) Int. Cl.
*F21S 8/00* (2006.01)
*F21S 10/00* (2006.01)
*G03B 21/20* (2006.01)
*G03B 25/00* (2006.01)
*G02B 27/00* (2006.01)
*G02B 5/18* (2006.01)
*G03H 1/30* (2006.01)
*G03H 1/22* (2006.01)
(Continued)

(52) U.S. Cl.
CPC .............. *F21S 8/035* (2013.01); *F21S 10/007* (2013.01); *G02B 5/1842* (2013.01); *G02B 27/0025* (2013.01); *G03B 21/2033* (2013.01); *G03B 25/00* (2013.01); *G03H 1/30* (2013.01); *F21Y 2101/00* (2013.01); *G03H 2001/2215* (2013.01); *G03H 2001/2223* (2013.01); *G03H 2001/2655* (2013.01); *G03H 2270/21* (2013.01); *G03H 2270/22* (2013.01); *G03H 2270/23* (2013.01)

(58) Field of Classification Search
CPC ...... F21S 8/035; F21S 10/007; F21Y 2101/02; G03H 1/30; G03H 2001/2215; G03H 2001/2223; G03H 2001/2655; G03H 2270/21; G03H 2270/23; G02B 5/1842; G02B 27/0025; G03B 25/00; G03B 21/2033
See application file for complete search history.

(56) References Cited

U.S. PATENT DOCUMENTS

| 7,832,918 | B2 | 11/2010 | Chien | |
| 8,721,160 | B2 * | 5/2014 | Chien | F21S 4/008 362/280 |
| 2011/0085323 | A1 * | 4/2011 | Chien | F21S 4/28 362/183 |

\* cited by examiner

*Primary Examiner* — Stephen F Husar
(74) *Attorney, Agent, or Firm* — Standley Law Group LLP

(57) ABSTRACT

The exemplary embodiments disclosed herein provide a light diffraction device positioned adjacent to a wall and comprising a laser and a diffractive imaging element. The diffractive imaging film having an image and positioned relative to the laser so as to create a projection of the image upon the wall. The diffractive film can also contain a series of images where the film is moved relative to the laser in order to create an animation effect upon the wall. In some embodiments, a distortion reflector may be positioned to accept the laser light exiting the diffractive imaging film and to distort the laser light to produce a desired image upon the wall. In some embodiments, additional reflectors may be used and in some further embodiments a distortion lens may be used.

14 Claims, 5 Drawing Sheets

(51) Int. Cl.
*G03H 1/26* (2006.01)
*F21Y 101/00* (2016.01)

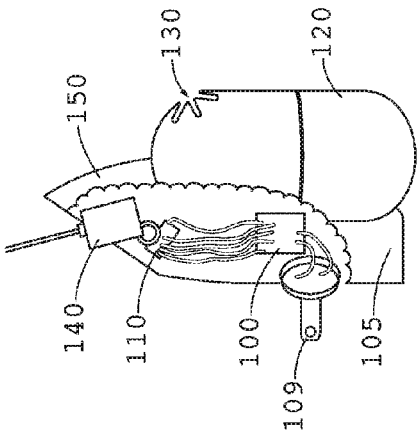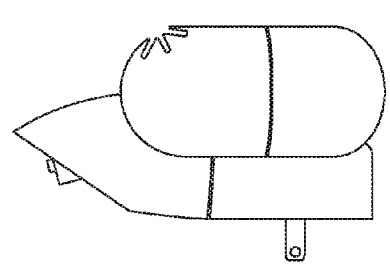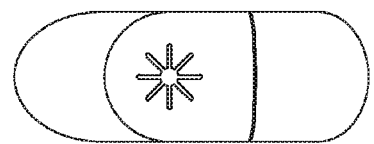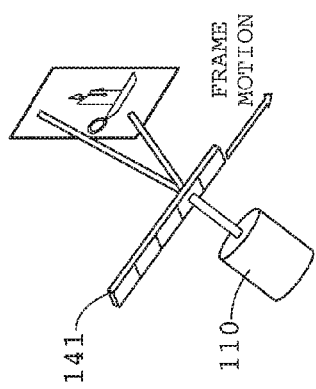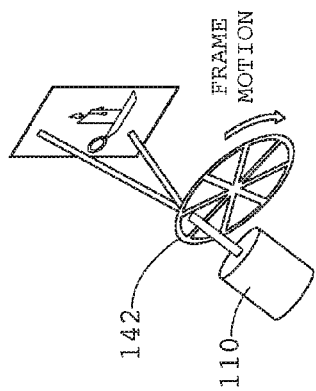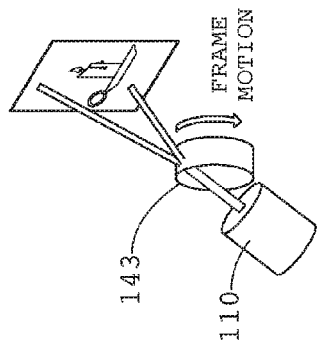

LIGHT DIFFRACTION DEVICE

CROSS-REFERENCE TO RELATED APPLICATIONS

This application claims priority to U.S. Application No. 61/814,094, filed on Apr. 19, 2013 and is herein incorporated by reference in its entirety.

TECHNICAL FIELD

Embodiments generally relate to lighting devices.

BACKGROUND OF THE ART

Lighting devices such as nightlights, walkway lights, and accent lighting are used in a number of applications and for a number of different purposes. In some cases they are functional, providing illumination in specific areas which may be dark (either always or only during the nighttime). While in other cases they are aesthetic, adding color or accenting a wall or feature of a room for decorative purposes.

SUMMARY OF THE EXEMPLARY EMBODIMENTS

Exemplary embodiments provide a lighting device utilizing diffractive imaging technology to create an image upon a surface. In some embodiments the lighting device is capable of producing a series of images in a sequence, resulting in animation that is projected upon the surface. In some embodiments multiple light sources may be used of varying colors to provide a color enhancement of the image.

In some embodiments a distortion reflector may be used, either with or without an additional reflector element. Some embodiments may also use a distortion compensation lens.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which:

FIG. 1A shows a front view of a basic embodiment of the invention.

FIG. 1B shows a side view of a basic embodiment of the invention.

FIG. 1C shows a partially hidden side view of a basic embodiment of the invention, where the internal components can be observed.

FIG. 2 shows an illustration of one embodiment for providing animation with the diffractive imaging films when moving laterally.

FIG. 3 shows an illustration of a first embodiment for providing animation with the diffractive imaging films when moving rotationally.

FIG. 4 shows an illustration of a second embodiment for providing animation with the diffractive imaging films when moving rotationally.

DETAILED DESCRIPTION

Figure 7:
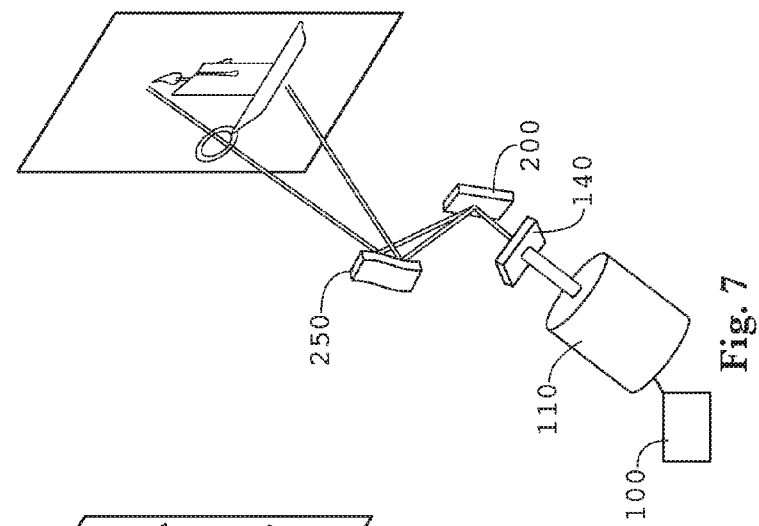
FIG. 7 shows an illustration of one embodiment of the lighting device using a reflector and a distortion reflector.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIGS. 1A-1C show a front view, side view, and partially hidden side view of a basic embodiment of the invention. In this embodiment, the incoming power may be connected to the drive circuitry 100 which is placed in electrical communication with the laser 110. A fragrance bulb 120 and fragrance port 130 may be used with these embodiments and placed on the front portion of the device. The laser 110 is preferably oriented to direct light through the diffractive imaging film 140. A laser shield 150 may be used with these embodiments for several purposes, including but not limited to: mechanical support, translucent effects, and/or shadowing of the projected image. One or more components, including but not limited to the drive circuitry 100 and laser 110, may be contained within a housing 105. Electrical prongs 109 may connect electrically with the drive circuitry 100 and may extend from the housing 105.

Exemplary embodiments utilize a diffractive imaging film 140 which uses diffractive patterning to redirect coherent light for the purpose of creating a monochrome image upon a surface. These imaging films typically consist of an array of elements that are lithographed onto or stamped into a substrate. Coherent (ex. laser) light incident on the film 140 may project a static image of the film at some point on a surface behind the film 140. Generally speaking with respect to these diffractive imaging films, only coherent (ex. laser) light will create the intended image. When incoherent light is used with these films, the light is randomly scattered and generally will not produce an acceptable image.

At least one of the benefits of using a diffractive imaging film 140 is that the image that is generated can have a very long focal length, when compared to traditional imaging techniques. In most cases, the same film can be used with multiple wavelengths of light to create the same image in a different color. However, in some cases due to the diffraction, the size of the image may be different when using different colored light sources. Generally, the direction of the projected image is set by the direction of the light source (ex. laser).

In some cases, the lighting device may be positioned close to a wall, where it may be desired to project the image upon the same wall. In this case, the surface (ex. wall) accepting the image may be at a very steep angle from the projection axis. If the imaging film is not altered to account for this, the image may be distorted and/or blurred. While in some embodiments these drawbacks are acceptable, it may be desirable to provide accurate image reproduction as well as the desired focal length, even though the angle between the wall and the projection axis is steep. In these cases, an exemplary embodiment would provide a pre-distortion of the image on the diffractive imaging film 140, so that the image appears correctly on the surface or wall being projected upon. This pre-distortion can be obtained by running computer simulations for the film at the angle of impacting light, so that a proper pre-distortion of the image within the film can be determined, without the need to produce the proper pre-distortion through a 'trial and error' process using real films (which could be time consuming and/or produce a lot of wasted materials). An exemplary embodiment can also provide the focal correction within the pre-distorted film. Even though the diffractive film 140 can provide very long focal lengths, it may still be advantageous to further optimize focal depth if the image surface is clearly defined. The diffractive film can be designed to incorporate the optimal focal depth for each optical ray independently.

FIG. 2 shows an illustration of one embodiment for providing animation with a series of diffractive imaging films 141 when moving laterally. In this embodiment, a 'constant on' laser 110 can direct light through a strip containing a series of frames having slightly different images. Due to the unique interaction between a laser 110 and the diffractive imaging film, a series of images can be projected upon a surface without smearing between the images, regardless of the lateral motion of the imaging film 141. In this way, a strobed light source or shutter is not required, which would be necessary for traditional animation techniques. A rotational motor or a linear translating device could provide the frame motion here.

FIG. 3 shows an illustration of a first embodiment for providing animation with the diffractive imaging films when moving rotationally. Here, a flat disc 142 is used where the disc has been divided into several sections, each section having a slightly different image. A rotational motor of some type may be used to drive the rotation of the flat disc 142.

FIG. 4 shows an illustration of a second embodiment for providing animation with the diffractive imaging films when moving rotationally. Here, a film wheel 143 is provided which has been divided into several sections, each section having a slightly different image. Again, a rotational motor of some type me be used to drive the film wheel 143. It should be noted that while the figure shows the light from the laser 110 entering the interior surface of the film wheel 143 and exiting the exterior surface of the film wheel 143, this is not required. Other embodiments could orient the laser 110 such that the light would be entering the exterior surface of the film wheel 143 while exiting through the interior surface of the film wheel 143. A rotational motor of some type may be used to drive the rotation of the film wheel 143.

Figure 5:
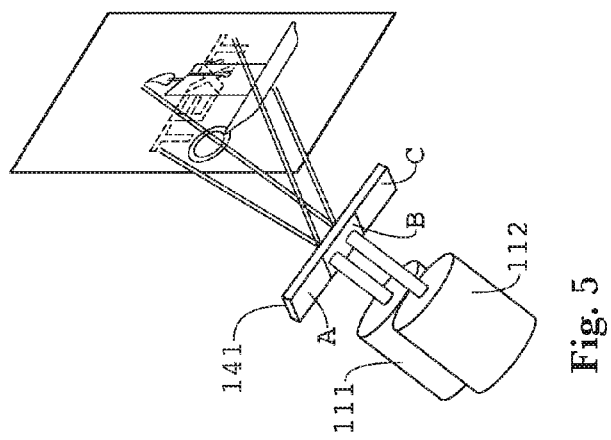
FIG. 5 shows an illustration of one embodiment using multiple lasers of different colors.

FIG. 5 shows an illustration of one embodiment using multiple lasers of different colors. As shown here, a red laser 111 and a green laser 112 are directing light towards the same frame B of a diffractive imaging film strip 141. In some embodiments, both lasers 111 and 112 may be directed towards the same portion of the image frame B, while in other embodiments (as shown here) the lasers 111 and 112 can be directed to separate portions of the same image frame B. In further embodiments there may be a separate diffractive imaging film for each laser 111 and 112. It is important to note that using multiple lasers of different colors is color additive and can therefore be optimized such that an observer would perceive multiple colors although only select colors are being supplied.

Figure 6:
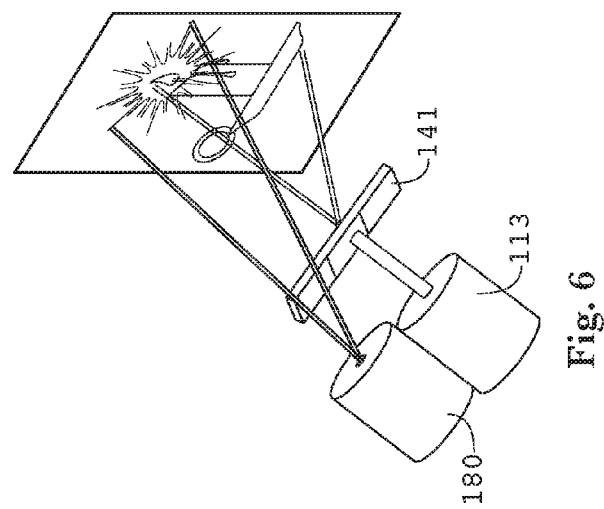
FIG. 6 shows an illustration of one embodiment using a laser of a first color in combination with an LED of a second color.

FIG. 6 shows an illustration of one embodiment using a laser 113 of a first color in combination with an LED 180 of a second color. The LED 180 can provide focused or diffuse light to the image. In this embodiment, the LED 180 is not directing light through the diffractive image film 141 but is instead directing the light towards the projected image itself. However, it should be stated that some embodiments may direct the LED light through the diffractive image film 141. It is also important to note that using a laser 113 of a first color with an LED 180 of a second color in this way is color additive and can therefore be optimized such that an observer would perceive multiple colors although only select colors are being supplied.

Further embodiments may also include light emitting from a white or colored bulb, which can also enhance the image. A shadowing aperture and/or chromatic filters can be used.

FIG. 7 shows an illustration of one embodiment of the lighting device using a reflector 200 and a distortion reflector 250. The distortion reflector 250 can be a convex mirror to counteract vertical and horizontal distortion. The distortion reflector 250 can also be a cylindrical parabolic mirror to counteract only vertical distortion where the horizontal distortion is handled by the diffractive film 140.

Figure 8:
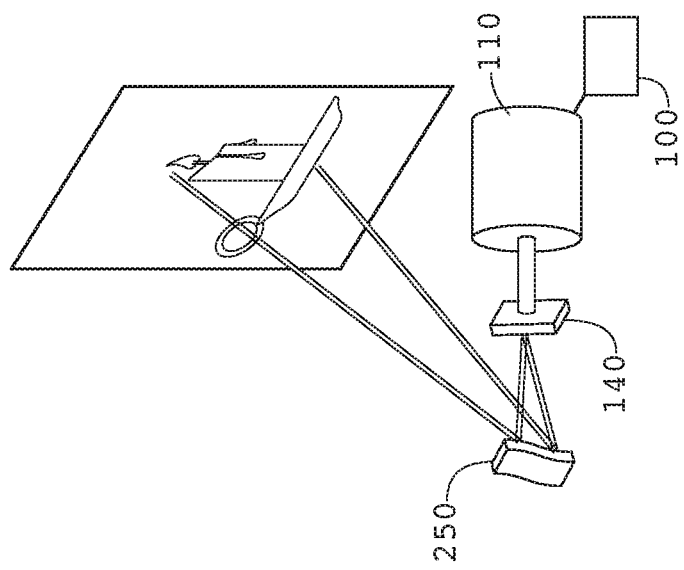
FIG. 8 shows an illustration of one embodiment of the lighting device using a distortion reflector.

FIG. 8 shows an illustration of one embodiment of the lighting device using a distortion reflector 250.

Figure 9:
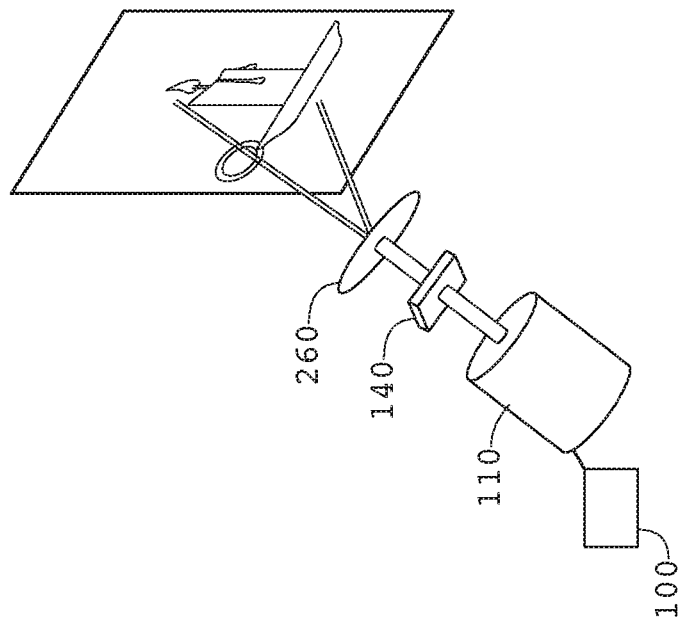
FIG. 9 shows an illustration of one embodiment of the lighting device using a distortion compensation lens.

FIG. 9 shows an illustration of one embodiment of the lighting device using a distortion compensation lens 260.

Figure 10:
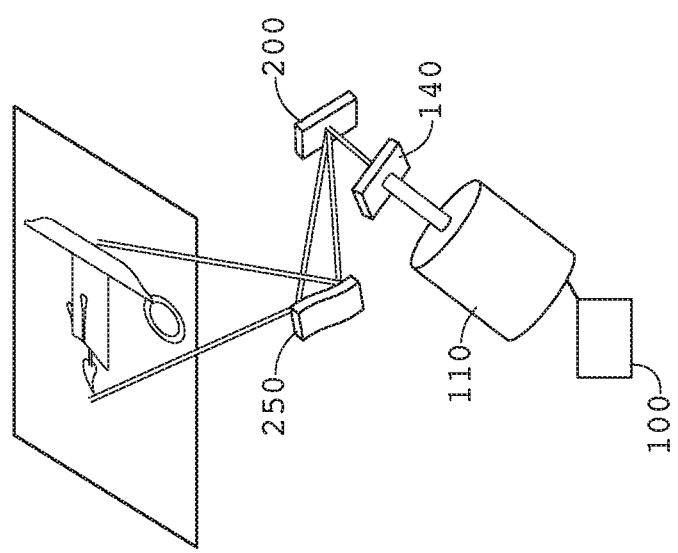
FIG. 10 shows an illustration of an embodiment of the lighting device arranged to project the image onto the ceiling, where this specific embodiment uses a reflector and a distortion reflector.

FIG. 10 shows an illustration of an embodiment of the lighting device arranged to project the image onto the ceiling, where this specific embodiment uses a reflector 200 and a distortion reflector 250.

Figure 11:
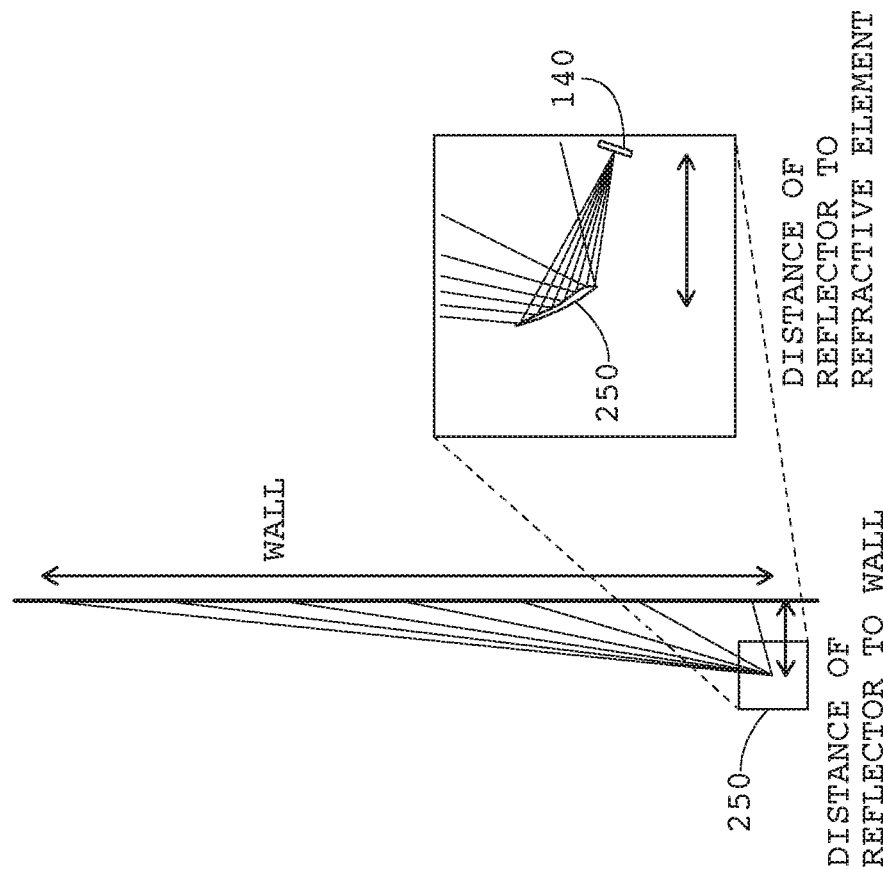
FIG. 11 shows a side view illustration of a distortion reflector and its use with the diffractive film.

FIG. 11 shows a side view illustration of a distortion reflector 250 and its use with the diffractive film 140.

Figure 12:
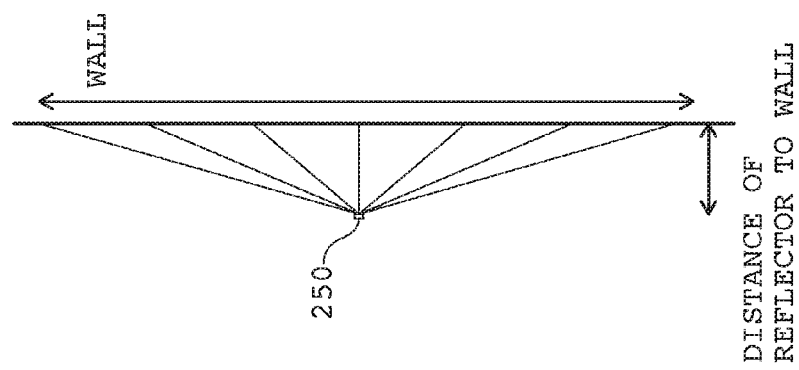
FIG. 12 shows a top view illustration of a distortion reflector and its use with the diffractive film.

FIG. 12 shows a top view illustration of a distortion reflector 250 and its use with the diffractive film. In an exemplary embodiment, the distortion reflector 250 would have a surface type of even asphere. Preferably, the reflector 250 is positioned approximately 3.5 inches or less from the wall. Also preferably, the reflector is positioned 0.5-0.7 inches from the diffractive optical element (DOE) or diffractive film 140, as used herein. Also preferably, the image, once projected is at least 27 inches wide and 38 inches tall on the wall. An exemplary reflector 250 would also be approximately 0.3 inches across and would have a sphere radius of approximately 9-11 mm and most preferably approximately 10.6 mm.

Figure 13:
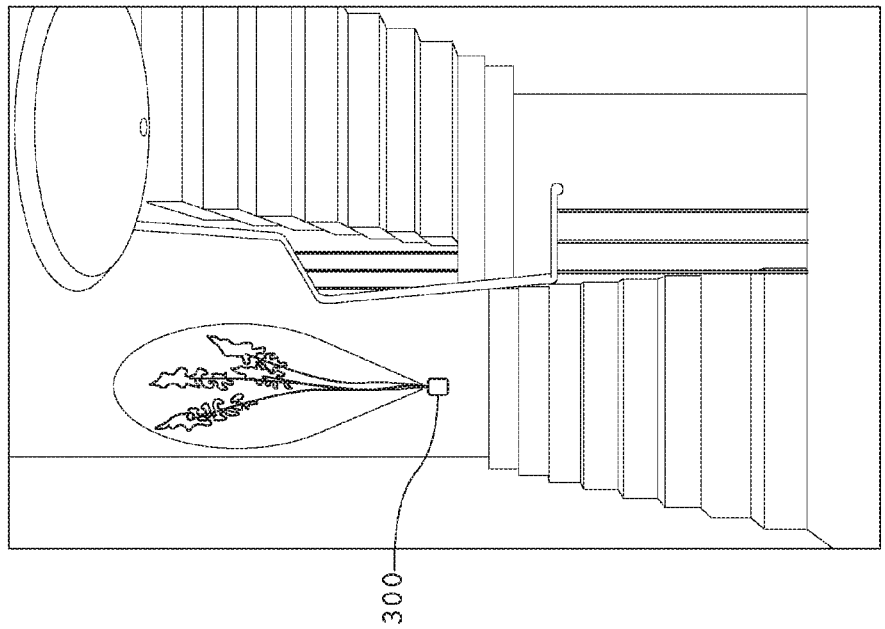
FIG. 13 shows an illustration of an exemplary use of the device to project the image onto a wall.

FIG. 13 shows an illustration of an exemplary use of the device 300 to project the image onto a wall.

Those of skill in the art should realize that it is not necessary for the lighting device to plug into a standard power outlet, as the device could simply be mounted on (or next to the wall) and could be powered through batteries, solar power, or through a wired connection.

While shown herein with respect to walls and ceilings, the lighting devices described herein could be adapted for projection onto any surface, including but not limited to any combination of the ceiling, floor, or other walls. Some embodiments may be combined with a fragrance dispenser, a night light, or some form of seasonal decorative illuminator.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

We claim:

1. A light diffraction device for positioning adjacent to a wall and comprising:
    a laser; and
    a diffractive imaging film having an image and positioned relative to the laser so as to create a projection of the image upon the wall when the device is positioned adjacent to a wall.

2. The light diffraction device of claim 1 wherein:
    the diffractive imaging film contains further images where movement of the diffractive imaging film causes the further images to be impacted and projected by the laser upon the wall.

3. The light diffraction device of claim 1 wherein:
    the diffractive imaging film is provided as a strip with a series of images.

4. The light diffraction device of claim 1 further comprising:
    a light emitting diode positioned to direct light onto the projected image upon the wall.

5. A light diffraction device for positioning adjacent to a wall having an electrical outlet, the device comprising:
    a housing;
    electrical prongs which extend from the housing and into the electrical outlet;
    a laser placed within the housing;
    drive circuitry placed within the housing and placed in electrical connection with the electrical prongs as well as the laser; and
    a diffractive imaging film having an image and positioned relative to the laser so as to create a projection of the image upon the wall when the device is positioned adjacent to a wall.

6. The light diffraction device of claim 5 further comprising:
    an LED positioned to direct light towards the wall.

7. The light diffraction device of claim 6 wherein:
    the light from the LED does not pass through the diffractive imaging film.

8. The light diffraction device of claim 5 wherein:
    the housing contains a first side which faces the wall and a second side which faces away from the wall, where the electrical prongs extend from the first side.

9. The light diffraction device of claim 8 further comprising:
    a fragrance bulb extending from the second side of the housing.

10. The light diffraction device of claim 5 wherein:
    the laser and LED are oriented such that an optical axis for the light emitted by the laser is substantially parallel to an optical axis of the light emitted by the LED.

11. A light diffraction device for positioning adjacent to a wall having an electrical outlet, the device comprising:
    a housing having a first side which faces the wall and a second side which faces away from the wall;
    electrical prongs which extend from the first side of the housing and into the electrical outlet;
    a laser placed within the housing and oriented to direct light away from the second side of the housing;
    drive circuitry placed within the housing and placed in electrical connection with the electrical prongs as well as the laser; and
    a diffractive imaging film placed within a path of the light emitted by the laser.

12. The light diffraction device of claim 11 wherein:
    the diffractive imaging film and laser are positioned relative to one another so as to create an image upon the wall that is located vertically above the device.

13. The light diffraction device of claim 11 wherein:
    the diffractive imaging film and laser are positioned relative to one another so that no image is created on a portion of the wall that is adjacent to the device.

14. The light diffraction device of claim 11 wherein:
    the diffractive imaging film and laser are positioned relative to one another so that no image is created on a portion of the wall that is adjacent to the device.

* * * * *